United States Patent [19]

Emery

[11] Patent Number: 5,047,102

[45] Date of Patent: Sep. 10, 1991

[54] ADHESION OF SUCTION CUP MOUNTED DEVICES ON A POROUS WALL

[75] Inventor: William W. Emery, Berkeley Heights, N.J.

[73] Assignee: Better Sleep Manufacturing Co., Berkeley Heights, N.J.

[21] Appl. No.: 419,684

[22] Filed: Oct. 11, 1989

[51] Int. Cl.⁵ .............................................. E04B 2/00
[52] U.S. Cl. ...................................... 156/71; 29/401.1; 52/309.3; 52/746; 156/66; 156/249; 156/306.3; 156/3.3; 248/205.3; 248/205.4; 248/205.5; 248/205.6; 248/467
[58] Field of Search .................. 156/66, 249, 71, 313, 156/306.3; 52/309.3, 746; 248/205.3, 205.4, 205.5, 205.6, 467; 29/401.1

[56] References Cited

U.S. PATENT DOCUMENTS

| 2,557,434 | 6/1951 | Hoverder | 156/71 |
| 3,168,276 | 2/1965 | Schneider | 248/467 |
| 4,421,288 | 12/1983 | Blaszkowski | 248/205.4 |

Primary Examiner—John J. Gallagher
Attorney, Agent, or Firm—Hopgood, Calimafde

[57] ABSTRACT

Adherence of suction cup-supported devices to a wall or other surface is improved by adhesively applying a patch made of a film or sheet of smooth, non-porous material to the wall at places where adherence of the suction cups is desired and then applying a suction cup to the patch. Good adherence of the cup is obtained even to a porous wall.

5 Claims, No Drawings

ADHESION OF SUCTION CUP MOUNTED DEVICES ON A POROUS WALL

The invention is directed to improvement in the adhesion of suction cup-mounted devices on a porous wall.

BACKGROUND OF THE INVENTION

Suction cups, per se, have long been known principally as novelty devices for suspending articles of light weight upon nonporous surfaces such as window panes, glazed ceramic tiles, etc. More recently, improved suction cups made of relatively soft plastic materials such as polyvinyl chloride have been developed, with improved design features such as a sturdy mounting base on the reverse side of the cup having a through-hole parallel to the suction face to hold a shelf, shower caddy or other storage device. These suction cups have been found, surprisingly, capable of holding substantial weights.

The former novelty device, due to superior technology, may now be regarded as an engineering development in the area of load support devices. Despite the new technology in suction cup development, they are still only capable of engineering utility when mounted upon non-porous surfaces such as glass, glazed ceramic tile, etc. Even then, care is required when mounting the suction cups to obtain satisfactory load-carrying capability. It must be remembered that the force responsible for adhering the cup to a surface is atmospheric pressure. Hence, mounting on a porous wall is a problem since infiltration of air to the interface between cup and wall results in equalization of pressure between the suction face and the reverse face of the cup, and it then drops off the wall.

It is to be recognized that the utility of suction cup mounted devices would be increased considerably if mounting upon a porous wall surface became possible. The present invention is directed to the solution of this problem. It must be remembered that homes and commercial buildings are characterized in the main by porous wall surfaces such as plaster, wall board, wood, cinder block, concrete block, etc., to which suction cups do not adhere.

SUMMARY OF THE INVENTION

In accordance with the invention, the portions of a wall, particularly a porous wall, to which suction cups are to be adhered, are first covered with an adhesively applied patch made of a film or sheet of smooth, non-porous material. Preferably the patch is made of a flexible film or sheet produced from a plastic material such as PVC, polyethylene, polyester, etc. or foil film such as aluminum. The patch may be fabricated with acrylic, rubber or epoxy adhesive spread on one surface, with the adhesive layer then being covered in a conventional manner with a thin releaseable, protective layer of a film material such as a plastic, treated paper and the like.

The area of the patch is preferably at least about 1.5 times larger than the area of the cup to be applied thereto. As the porosity of the wall material involved increases, the area of the patch must also increase. This is true since only the projected area of the wall surface which can be contacted with the adhesive on the patch will contribute any load-carrying capacity. In this context, "projected area" of the wall is the portion of the patch area which is actually in adhesive contact with the wall surface. For example, with a highly porous wall material such as painted cinder block, the surface area which can actually be contacted by the adhesive can be considerably less than 50% of the total area, even 25% or less. The patch area must accordingly be increased in such a case. The thickness of the patch material itself will be in the range of about 2 mils to about 6 mils, and the thickess of the adhesive layer may be about 0.5 mil to about 3 mils. For aesthetic purposes, the patch material may be clear or frosty clear to permit the color of the underlying wall to appear or it may be colored. It will, of course, be appreciated that the protective release layer covering the adhesive on the patch is removed before applying the patch to the wall.

What is claimed is:

1. A method for improving the load-carrying capacity of a wall-mounted device supported on a porous wall by suction cups which comprises adhesively applying to the portion of said wall upon which said suction cups are to be mounted a smooth, non-porous patch and then mounting said suction cup upon said patch.

2. The method in accordance with claim 1 in which the area of said patch in adhesive contact with said wall is at least about 1.5 times the area of the suction cup to be mounted thereon.

3. The method in accordance with claim 1 wherein said patch material is selected from the group consisting of PVC, polyethylene, polyester and aluminum foil.

4. The method in accordance with claim 1 wherein said patch is applied by means of an adhesive selected from the group consisting of acrylic, rubber, and epoxy based adhesives.

5. The method in accordance with claim 1 wherein the smooth, non-porous patch is flexible.

* * * * *